United States Patent
Heo

(10) Patent No.: US 9,837,656 B2
(45) Date of Patent: Dec. 5, 2017

(54) RECHARGEABLE BATTERY HAVING FLEXIBLE CONFIGURATION

(71) Applicant: SAMSUNG SDI CO., LTD., Yongin-si, Gyeonggi-do (KR)

(72) Inventor: Sang-Do Heo, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 227 days.

(21) Appl. No.: 14/752,264

(22) Filed: Jun. 26, 2015

(65) Prior Publication Data

US 2016/0268574 A1    Sep. 15, 2016

(30) Foreign Application Priority Data

Mar. 11, 2015  (KR) .................. 10-2015-0033710

(51) Int. Cl.
*H01M 2/20* (2006.01)
*H02J 7/00* (2006.01)
*H01M 10/42* (2006.01)
*H01M 2/30* (2006.01)

(52) U.S. Cl.
CPC ......... *H01M 2/204* (2013.01); *H01M 10/425* (2013.01); *H02J 7/0029* (2013.01); *H01M 2/30* (2013.01); *H01M 2220/30* (2013.01); *H02J 2007/0037* (2013.01); *H02J 2007/0039* (2013.01)

(58) Field of Classification Search
CPC .................................................... H01M 2/204
USPC ......................................................... 320/112
See application file for complete search history.

(56) References Cited

U.S. PATENT DOCUMENTS

| 1,215,004 | A | * | 2/1917 | Decker | H01M 2/204 429/121 |
| 2,096,627 | A | * | 10/1937 | Deibel | H01M 2/204 429/1 |
| 5,594,192 | A | * | 1/1997 | Rodriguez | F41A 9/76 89/33.16 |
| 5,752,377 | A | * | 5/1998 | Small | B21L 21/00 59/11 |
| 7,858,221 | B2 | * | 12/2010 | Sato | B23K 11/004 429/121 |
| 8,387,777 | B2 | * | 3/2013 | Tokhtuev | B65G 43/02 198/502.1 |
| 8,530,073 | B2 | * | 9/2013 | Byun | H01M 2/204 429/158 |
| 8,632,369 | B2 | * | 1/2014 | Lee | H01G 9/26 439/766 |
| 9,368,782 | B2 | * | 6/2016 | Soleski | H01R 11/282 |
| 2011/0133695 | A1 | * | 6/2011 | Cadway | B25F 5/00 320/114 |

(Continued)

FOREIGN PATENT DOCUMENTS

KR   10-2007-0014654 A    2/2007
KR      10-0778511 B1    11/2007

(Continued)

*Primary Examiner* — Drew A Dunn
*Assistant Examiner* — Jerry D Robbins
(74) *Attorney, Agent, or Firm* — Lee & Morse, P.C.

(57) ABSTRACT

A rechargeable battery including a plurality of battery cells disposed in parallel; and a connection unit connected to ends of the plurality of battery cells such that each battery cell of the plurality of battery cells is rotatable with respect to an adjacent battery cell.

12 Claims, 9 Drawing Sheets

(56) References Cited

U.S. PATENT DOCUMENTS

2015/0072218 A1* 3/2015 Yi ..................... H01M 2/0275
429/158
2015/0162577 A1* 6/2015 Takano ............... H01M 2/1005
429/65

FOREIGN PATENT DOCUMENTS

KR    10-2008-0102547 A    11/2008
KR    10-2013-0140980 A    12/2013

* cited by examiner

RECHARGEABLE BATTERY HAVING FLEXIBLE CONFIGURATION

CROSS-REFERENCE TO RELATED APPLICATION

Korean Patent Application No. 10-2015-0033710, filed on Mar. 11, 2015, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery can be recharged and discharged, unlike a primary battery that cannot be recharged. A low capacity rechargeable battery may be used for a small portable electronic device such as a mobile phone, a laptop computer, and/or a camcorder, and a large capacity of rechargeable battery may be used as a power source for driving a motor such as for a hybrid vehicle.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including a plurality of battery cells disposed in parallel; and a connection unit connected to ends of the plurality of battery cells such that each battery cell of the plurality of battery cells is rotatable with respect to an adjacent battery cell.

The connection unit may include at least one first connection portion connecting one adjacent pair of battery cells; and at least one second connection portion on an outer surface of the first connection portion, the second connection portion connecting another adjacent pair of battery cells, one battery cell of the other adjacent pair of battery cells being a part of the one adjacent pair of battery cells connected by the first connection portion.

The first connection portion and the second connection portion may be alternately and sequentially coupled with each other at ends of the plurality of battery cells.

The first connection portion and the second connection portion may be made of a conductive material.

The second connection portion positioned at one end of the plurality of battery cells may be formed of a conductive material, the first connection portion positioned at the one end of the plurality of battery cells may be formed of a non-conductive material, the second connection portion positioned at another end of the plurality of battery cells may be formed of a non-conductive material, and the first connection portion positioned at the other end of the plurality of battery cells may be formed of a conductive material.

The first connection portion may have a structure in which sides of two base portions having a circular plate shape are connected to each other, and the base portions may each include a through-hole therethrough, a terminal at an end of each battery cell penetrating the through-hole.

The first connection portion and the second connection portion may have a same shape.

The rechargeable battery may further include a control member positioned to be parallel with an endmost battery cell of the plurality of battery cells, the controller being connected to the connection unit.

The control member may be a protection circuit module that includes a protection circuit.

The plurality of battery cells may each have a circular cylindrical shape or a multiple columnar shape.

The rechargeable battery may further include a cap member enclosing a terminal at an end of each battery cell of the plurality of battery cells.

The cap member may have a circular shape.

One cap member may be coupled with terminals of an adjacent pair of battery cells.

The rechargeable battery may further include an insulation member between the ends of the battery cells and the connection unit.

The plurality of battery cells may be arranged such that terminals having a same polarity are aligned along one end of the plurality of battery cells.

The plurality of battery cells may be arranged such that a positive terminal of one battery cell and a negative terminal of another battery cell are alternately aligned along one end of the plurality of battery cells.

The connection unit may have an articulated structure.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
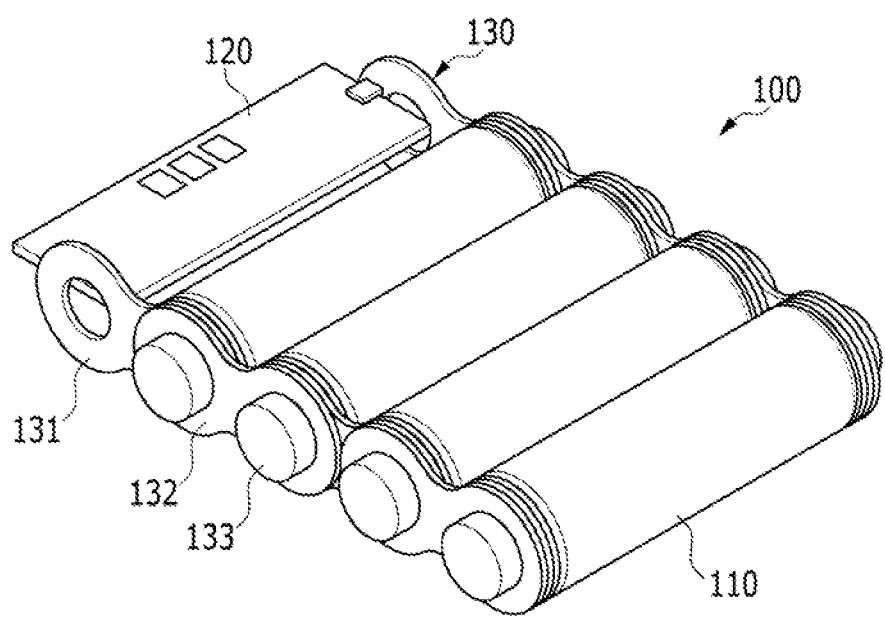
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. In addition, it will also be understood that when a layer is referred to as being "between" two layers, it can be the only layer between the two layers, or one or more intervening layers may also be present. Like reference numerals refer to like elements throughout.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" or "include" and variations such as "includes," "comprises" or "comprising" will be understood to imply the inclusion of stated elements but not the exclusion of any other elements.

Figure 2:
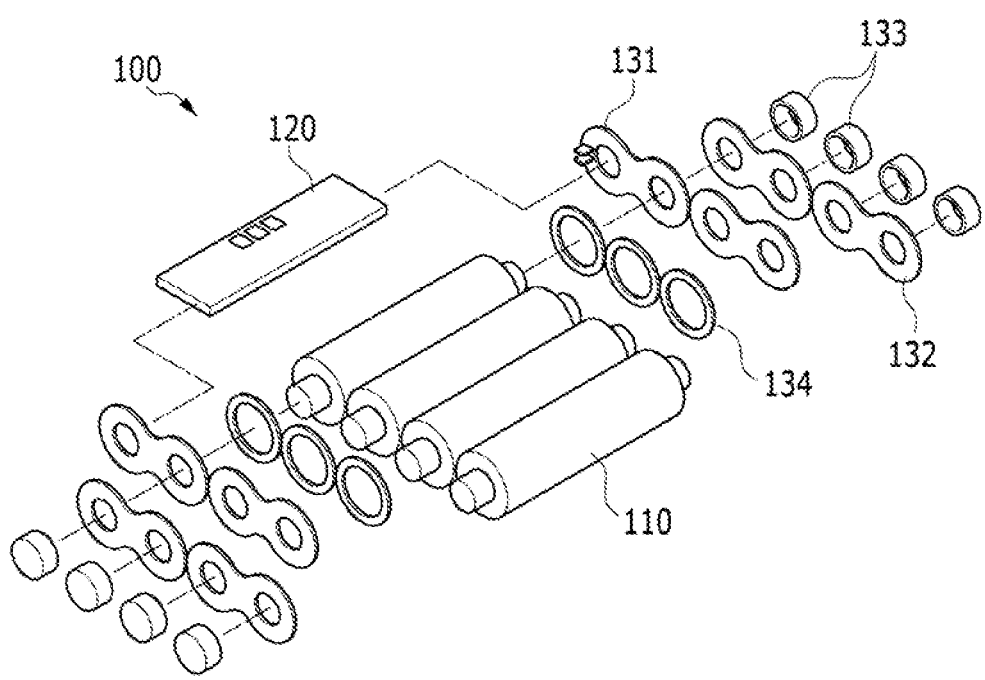
FIG. 2 illustrates an exploded perspective view of the rechargeable battery of FIG. 1.
Figure 3A:
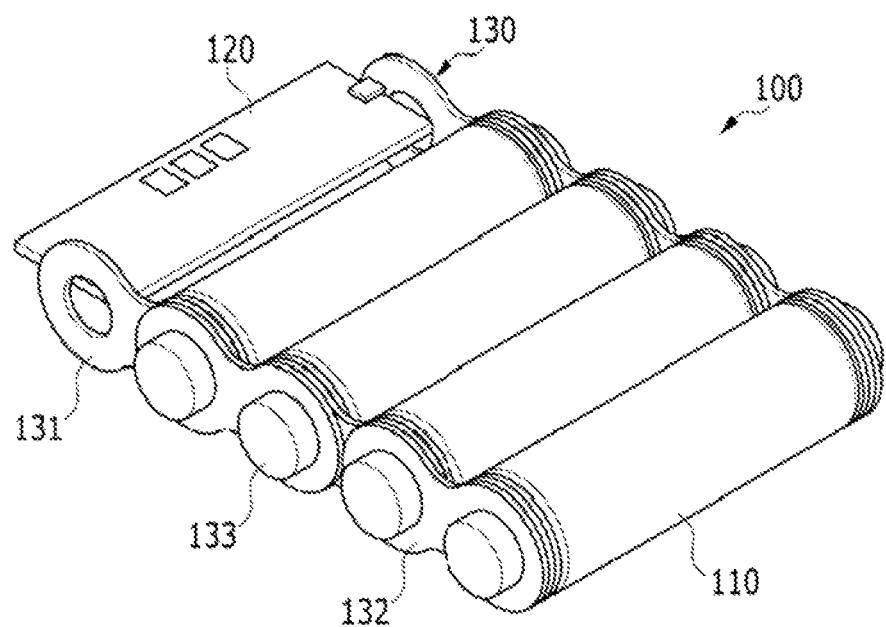
FIG. 3(A) to FIG. 5(B) illustrate various deformation shapes of the rechargeable battery of FIG. 1.
Figure 3B:
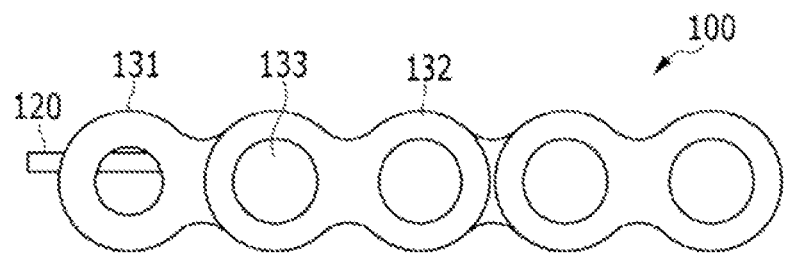
Figure 4A:
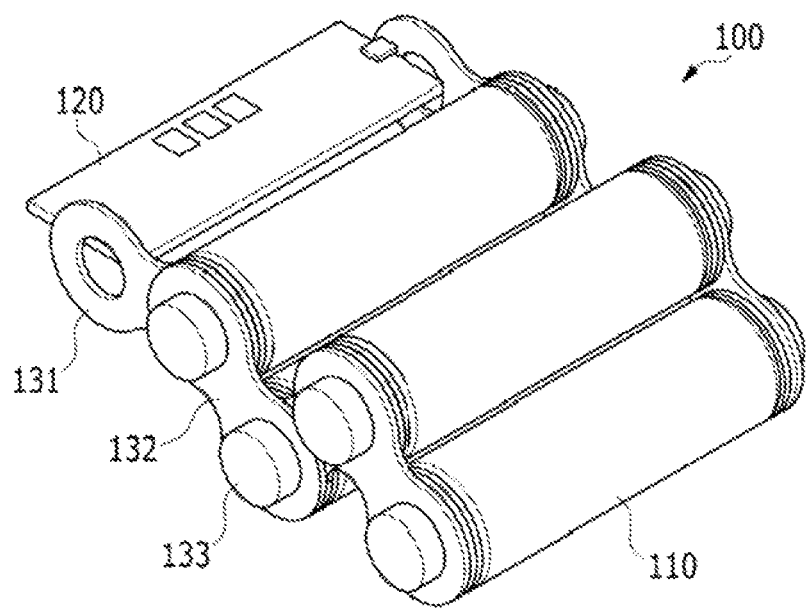
Figure 4B:
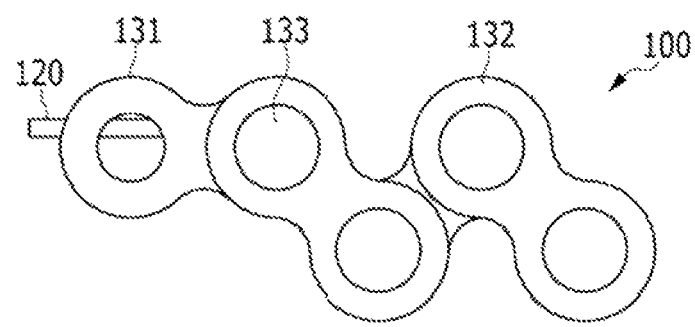
Figure 5A:
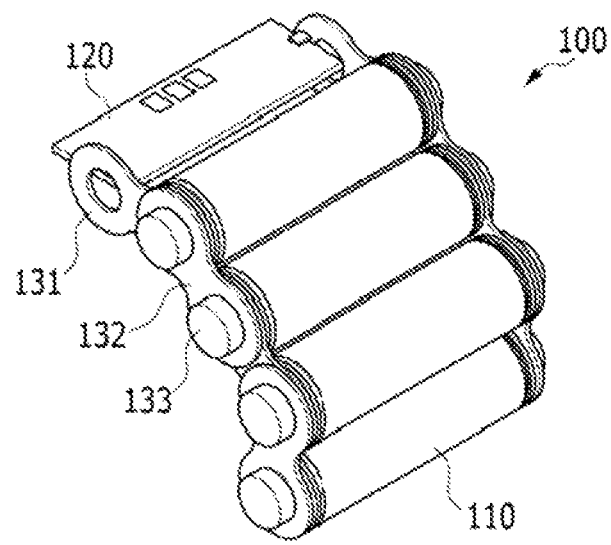
Figure 5B:
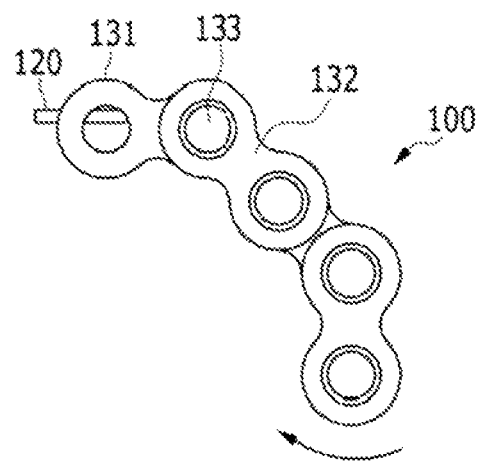

FIG. 1 illustrates a perspective view of a rechargeable battery according to an exemplary embodiment. FIG. 2 illustrates an exploded perspective view of the rechargeable battery of FIG. 1.

Referring to FIG. 1 and FIG. 2, the rechargeable battery 100 according to an exemplary embodiment may include a plurality of battery cells 110 and a connector or connection unit 130.

The pluralities of battery cells 110 may be disposed or aligned in parallel. For example, the plurality of battery cells 110 may be disposed or aligned parallel to each other. The plurality of battery cells 110 may be electrically connected, e.g., in parallel or in series, and this structure will be described in greater detail below.

The connection unit 130 may connect ends of the plurality of battery cells 110 such that the plurality of battery cells 110 may be rotated. For example, the connection unit 130 may allow or facilitate independent rotation of the plurality of battery cells 110 with respect to adjacent battery cells 110. For example, the connection unit 130 may allow the plurality of battery cells 110 to be modified as a whole. For example, the connection unit 130 may allow each battery cell 110 of the plurality of battery cells 110 to independently rotate or move, relative to an adjacent battery cell 110 of the plurality of battery cells. For example, the connection unit 130 may have an articulated structure such that the battery cells 110 may be independently rotatable.

In an implementation, the connection unit 130 may have a structure including, e.g., a first connection portion 131 and a second connection portion 132.

The first connection portion 131 may connect one adjacent pair of battery cells 110 in the plurality of battery cells 110. The first connection portion 131 may have a structure or shape such that, e.g., sides of two circular plates are connected to each other. In an implementation, the region of the first connection portion 131 having the circular plate shape may include a through-hole therethrough. A terminal at an end of the battery cell 110 may penetrate the through-hole of the first connection portion 131.

The second connection portion 132 may be positioned in or on an outer surface of the first connection portion 131. The second connection portion 132 may connect another pair of battery cells 110 connected by the first connection portion 131, e.g., may connect another adjacent pair of battery cells 110, only one of the other adjacent pair being a part of the one adjacent pair of battery cells 110 connected by the first connection portion 131. In an implementation, the second connection portion 132 and the first connection portion 131 may have the same shape.

In an implementation, in the connection unit 130 of the above-described structure, the first connection portion 131 and the second connection portion 132 may be sequentially and alternately coupled to the ends of the plurality of battery cells 110. For example, the first connection portion 131 may connect two battery cells 110 adjacent to each other to form a pair of battery cells 110, and the second connection portion 132 may connect another pair of battery cells 110 adjacent to each other.

In an implementation, the rechargeable battery 100 may include an insulation member 134. The insulation member 134 may be interposed between the end of the battery cell 110 and the connection unit 130. The insulation member 134 may be made of or may include a non-conductive material. For example, the material of the insulation member 134 may be a plastic or a ceramic.

In an implementation, the rechargeable battery 100 according to an exemplary embodiment may include a controller or control member 120. The control member 120 may be positioned to be parallel to any one battery cell 110 that is at an endmost position among the plurality of battery cells 110. The control member 120 may be connected to the connection unit 130. The controller 120 may be or may include, e.g., a protection circuit module (PCM). The protection circuit module may effectively control and/or prevent an abnormal state such as an overcharge or an overcurrent of the rechargeable battery.

In an implementation, the rechargeable battery 100 may include a cap or cap member 133. The cap member 133 may enclose the terminal that is at the end of each of the plurality of battery cells 110. In an implementation, the cap member 133 may have, e.g., a circular or hollow cylindrical shape. For example, the cap member 133 may have a hollow cylindrical shape that is closed at one end and open at an opposite end.

The cap member 133 may help protect the terminal of the battery cell 110 from undesirable and/or damaging external contact. In an implementation, the cap member 133 may help reduce the possibility of and/or prevent the connection unit 130 from being separated from the battery cell 110 in a state in which the connection unit 130 is coupled to the battery cell 110.

For example, in the state in which the cap member 133 encloses the end and the side of the terminal, an end of the terminal may be subjected to spot welding, and a side may be subjected to caulking, such that the cap member 133 may be strongly combined to the terminal.

FIGS. 3(A), 3(B), 4(A), 4(B), 5(A), and 5(B) illustrate schematic view of various deformation shapes of the rechargeable battery of FIG. 1.

Referring to FIG. 3(A) to FIG. 5(B), the battery cells 110 may be aligned parallel with one another in a chain shape or form by the described connection unit 130. The battery cells 110 may be freely or independently rotated with respect to each other. Accordingly, an overall shape of the rechargeable battery 100 according to an exemplary embodiment may be freely deformed as desired, e.g., based on a user's manipulation.

Figure 6:
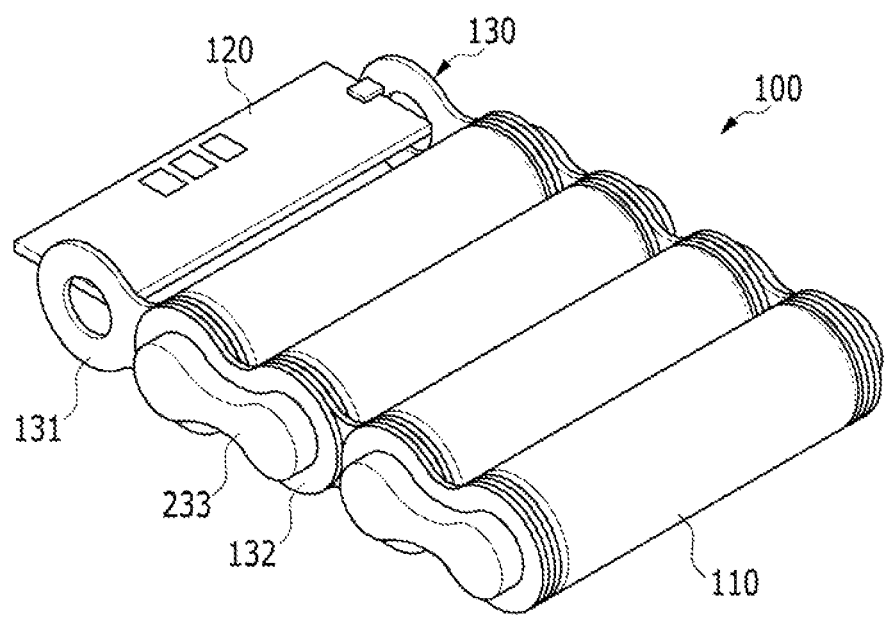
FIG. 6 illustrates a view of an exemplary variation of a cap member in a rechargeable battery according to an exemplary embodiment.

FIG. 6 illustrates a view of an exemplary variation of a cap member in a rechargeable battery according to an exemplary embodiment.

Referring to FIG. 6, one cap member 233 may connect the terminals at ends of a pair of battery cells 110. For example, the cap 233 may have a snowman or peanut shape. For example, the cap member 233 may have a shape that simultaneously encloses two adjacent terminals. In an implementation, the cap member 233 may be positioned to be close to an outer surface of the second connection portion 132.

By forming the cap member 233 with the shapes described above, when manufacturing the rechargeable battery 100, a single cap member 233 may cover two terminals at a time. For example, the manufacturing time may be shortened.

In an implementation, the battery cells 110 may have, e.g., a circular cylinder shape and/or a multiple columnar shape. For example, the battery cells 110 may have the circular cylinder shape to be disposed parallel to each other.

Figure 7:
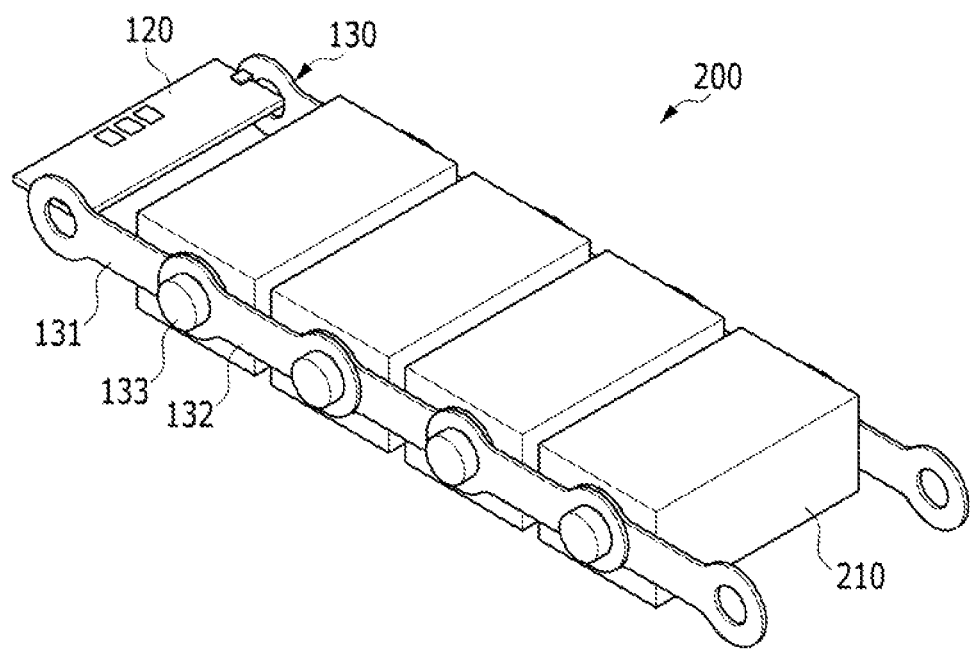
FIG. 7 illustrates a view of an exemplary variation of a battery cell in a rechargeable battery according to an exemplary embodiment.

FIG. 7 illustrates a view of a variation of a battery cell in a rechargeable battery 200 according to an embodiment.

As shown in FIG. 7, the battery cells 210 may have a square pillar (e.g., cuboid or hexahedral) shape to be disposed or arranged parallel to each other. In an implementation, the battery cells 210 may have, e.g., a film shape having a relatively thinner thickness than the cylindrical battery cell 210 among the square pillar shape.

Figure 8:
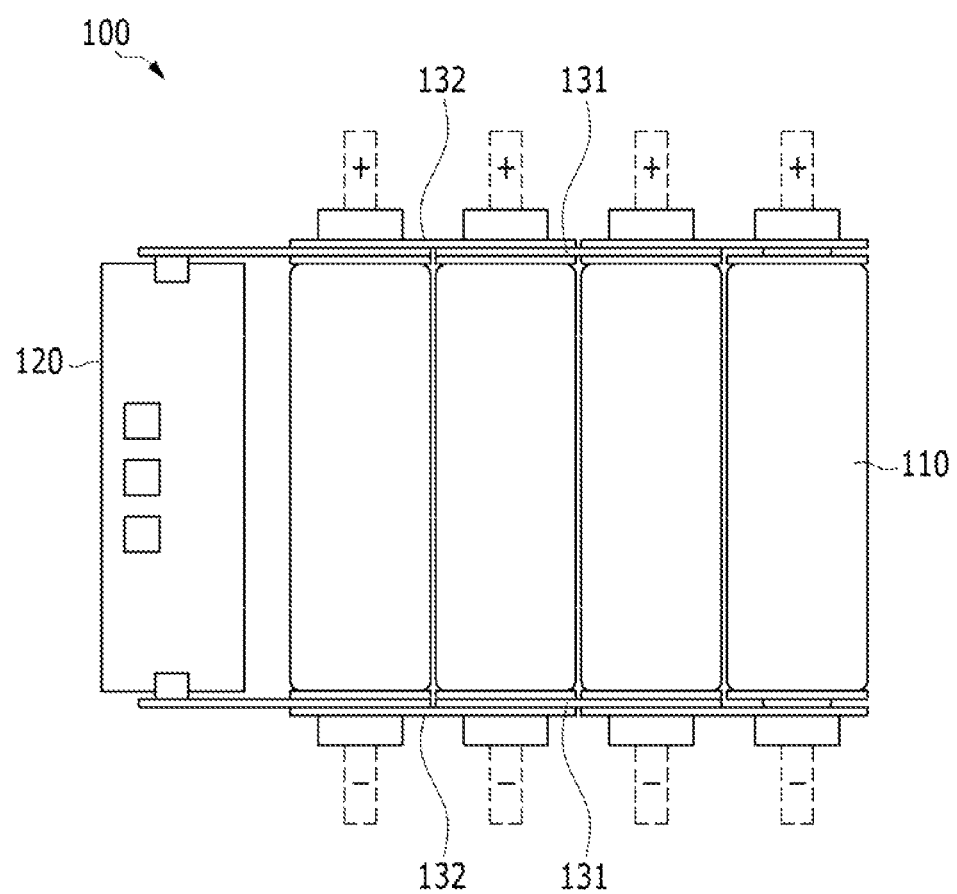
FIG. 8 illustrates a view showing a state in which battery cells are electrically connected in parallel in the rechargeable battery of FIG. 1.

FIG. 8 illustrates a view showing a state in which battery cells are electrically connected in parallel in the rechargeable battery of FIG. 1.

Referring to FIG. 8, the plurality of battery cells 110 may be positioned or aligned such that adjacent ends thereof may have the same polarity. For example, terminals having a same polarity may be aligned on a same side or end of the rechargeable battery 100. For example, the plurality of battery cells 110 may be electrically connected in parallel. For example, the first connection portion 131 and the second connection portion 132 may be formed of a conductive material.

Figure 9:
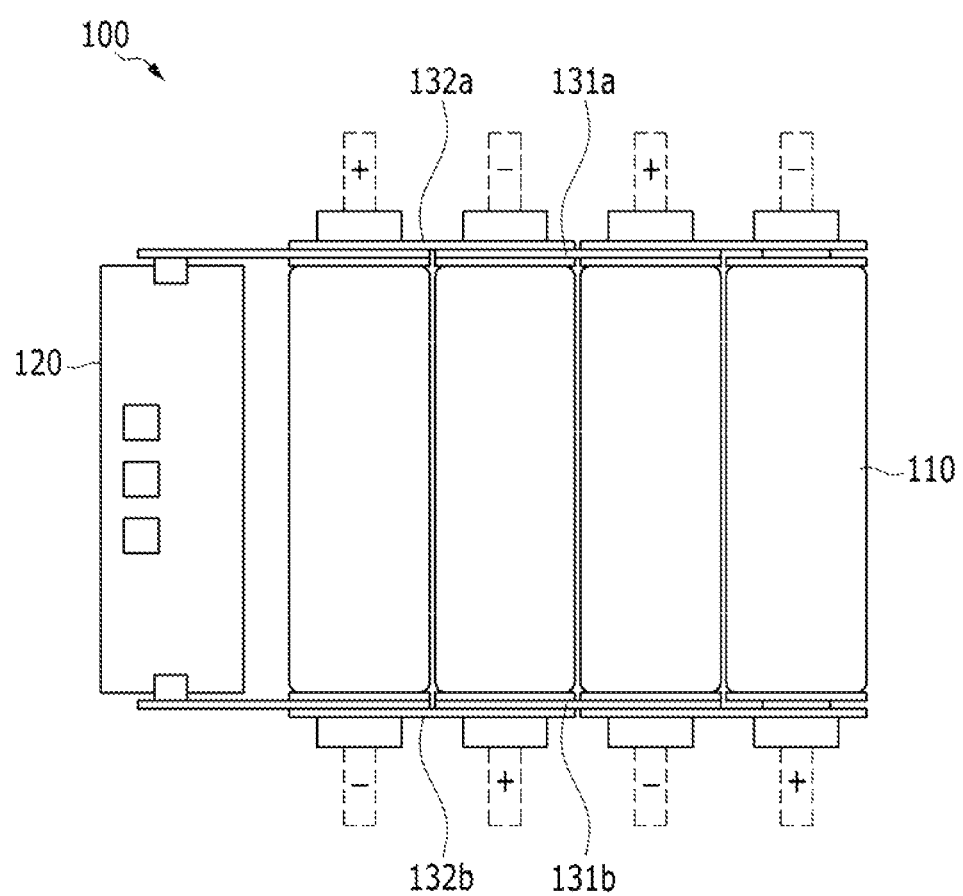
FIG. 9 illustrates a view showing a state in which battery cells are electrically connected in series in the rechargeable battery of FIG. 1.

FIG. 9 illustrates a view showing a state in which battery cells are electrically connected in series in the rechargeable battery of FIG. 1.

Referring to FIG. 9, the plurality of battery cells 110 may be electrically connected in series. For example, the plurality of battery cells 110 may be positioned or aligned such that the positive electrode or terminal and the negative electrode or terminal alternate along the ends or sides of the rechargeable battery 100.

For example, a second connection portion 132a at one end of the battery cell may be made of the conductive material, and a first connection portion 131a positioned at the same end may be made of a non-conductive material. Also, a second connection portion 132b at another end of the battery cell 110 is made of the non-conductive material, and a first connection portion 131b at the other end may be made of the conductive material.

As described above, depending on whether the battery cells 110 are disposed in parallel or in series, the material of the first connection portion 131 and the second connection portion 132 configuring the connection unit 130 may be manufactured by selecting one among the non-conductive material and the conductive material.

Again referring to FIGS. 5(A) and 5(B), the rechargeable battery 100 having the above-described structure according to an exemplary embodiment may include the connection unit 130. The connection unit 130 allows the plurality of battery cells 110 to be independently rotated in various directions with respect to adjacent battery cells 110. Accordingly, an entire overall shape of the rechargeable may be freely deformed by an external force, e.g., according to manipulation by a user or according to a shape of a device.

Therefore, when the rechargeable battery 100 according to an exemplary embodiment is mounted to the terminal including the flexible display, the rechargeable battery 100 may be bent in association with or corresponding to bending of the terminal.

For example, the free deformation made possible by the connection unit 130 may help decrease the manufacturing cost, compared with a case in which battery cells themselves are bent. For example, the rechargeable battery 100 according to an embodiment may be mounted to various flexible devices, and may be manufactured with a low cost.

Also, the rechargeable battery 100 according to an exemplary embodiment may be configured such that the entire shape is freely deformable according to the desire of the user, it may not be necessary to design a structure of the rechargeable battery 100 to be appropriate to the shape of the various portable devices every time. For example, the rechargeable battery according to an embodiment may be useable in different devices having different shapes and/or terminal configurations. Accordingly, the development cost of the rechargeable battery 100 may be reduced.

By way of summation and review, a device mounted with a display of which a screen is curved has been considered. In this flexible terminal or device, a body may also be made to be curved with the display. In some rechargeable batteries, it may be difficult to realize flexibility and a manufacturing cost thereof may be high. Accordingly, although the body is curved, the rechargeable battery may be used in a fixed form.

In this case, shapes of the flexible terminals may be respectively different, and a battery cell connection structure may be separately developed every time depending on a configuration of the battery cell and a design of the flexible terminal. As a result, the developing cost may be increased.

An embodiment may provide a rechargeable battery that is deformable into a desired shape or configuration by an external force.

The embodiments may provide a rechargeable battery that may be mounted without a design change when being mounted to various terminals or devices.

The rechargeable battery according to an embodiment may include the connection unit. The connection unit may facilitate independent rotation of the plurality of battery cells with respect to adjacent battery cells. Accordingly, an entire shape may be freely deformed into a desired shape or configuration by the external force (e.g., user manipulation).

Therefore, when the rechargeable battery according to an exemplary embodiment is mounted to the terminal including the flexible display, the rechargeable battery may be bent in association with bending of the terminal.

In this case, to realize the deformation with the connection unit may decrease the manufacturing cost, compared with a case in which the battery cell is itself bent. The rechargeable battery that is mountable to the flexible device may be manufactured with a low cost.

Further, the rechargeable battery according to an exemplary embodiment may be configured for the entire shape to be freely deformed according to the desire of the user, and it may not be necessary to design the structure of the rechargeable battery to be always appropriate to the shape of the various portable devices. Accordingly, the development cost of the rechargeable battery may be reduced.

The embodiments may provide a rechargeable battery that is mounted to a flexible terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made

DESCRIPTION OF SYMBOLS

| 100, 200: rechargeable battery | 110, 210: battery cell |
|---|---|
| 120: control member | 130: connection unit |
| 131, 131a, 131b: first connection portion | |
| 132, 132a, 132b: second connection portion | |
| 133, 233: cap member | 134: insulation member |

What is claimed is:

1. A rechargeable battery, comprising:
a plurality of battery cells disposed in parallel; and
a connection unit connected to ends of the plurality of battery cells such that a battery cell of the plurality of battery cells is rotatable with respect to an adjacent battery cell, wherein:
the connection unit includes:
first connection portions connecting one adjacent pair of battery cells; and
second connection portions on an outer surface of the first connection portions, the second connection portions connecting another adjacent pair of battery cells, one battery cell of the other adjacent pair of battery cells being a part of the one adjacent pair of battery cells connected by the first connection portions,
one second connection portion positioned at one end of the plurality of battery cells is formed of a conductive material,
one first connection portion positioned at the one end of the plurality of battery cells is formed of a non-conductive material,
another second connection portion positioned at another end of the plurality of battery cells is formed of a non-conductive material, and
another first connection portion positioned at the other end of the plurality of battery cells is formed of a conductive material.

2. The rechargeable battery as claimed in claim 1, wherein:
the first connection portions have a structure in which sides of two base portions having a circular plate shape are connected to each other, and
the base portions each include a through-hole therethrough, a terminal at an end of each battery cell penetrating the through-hole.

3. The rechargeable battery as claimed in claim 2, wherein the first connection portions and the second connection portions have a same shape.

4. The rechargeable battery as claimed in claim 1, further comprising a control member positioned to be parallel with an endmost battery cell of the plurality of battery cells, the controller being connected to the connection unit.

5. The rechargeable battery as claimed in claim 4, wherein the control member is a protection circuit module that includes a protection circuit.

6. The rechargeable battery as claimed in claim 1, wherein the plurality of battery cells each have a circular cylindrical shape or a multiple columnar shape.

7. The rechargeable battery as claimed in claim 1, further comprising a cap member enclosing a terminal at an end of each battery cell of the plurality of battery cells.

8. The rechargeable battery as claimed in claim 7, wherein the cap member has a circular shape.

9. The rechargeable battery as claimed in claim 7, wherein one cap member is coupled with terminals of an adjacent pair of battery cells.

10. The rechargeable battery as claimed in claim 1, further comprising an insulation member between the ends of the battery cells and the connection unit.

11. The rechargeable battery as claimed in claim 1, wherein the plurality of battery cells are arranged such that a positive terminal of one battery cell and a negative terminal of another battery cell are alternately aligned along one end of the plurality of battery cells.

12. The rechargeable battery as claimed in claim 1, wherein the connection unit has an articulated structure.

* * * * *